(12) United States Patent
Xie et al.

(10) Patent No.: US 8,028,268 B2
(45) Date of Patent: Sep. 27, 2011

(54) SYSTEM AND METHOD FOR BUILDING SOFTWARE PACKAGE FOR EMBEDDED SYSTEM

(75) Inventors: Weikai Xie, Shanghai (CN); Yudong Yang, Beijing (CN); Hang Jun Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1466 days.

(21) Appl. No.: 11/472,014

(22) Filed: Jun. 21, 2006

(65) Prior Publication Data

US 2007/0011494 A1    Jan. 11, 2007

(30) Foreign Application Priority Data

Jun. 21, 2005  (CN) .......................... 2005 1 0077434

(51) Int. Cl.
*G06F 9/44* (2006.01)
*G06F 9/45* (2006.01)
(52) U.S. Cl. ........................ 717/100; 717/140
(58) Field of Classification Search .................. None
See application file for complete search history.

(56) References Cited

U.S. PATENT DOCUMENTS

| 5,787,281 | A | * | 7/1998 | Schreiber et al. | 719/328 |
| 5,881,289 | A | * | 3/1999 | Duggan et al. | 717/145 |
| 5,953,514 | A | * | 9/1999 | Gochee | 717/138 |
| 6,279,151 | B1 | * | 8/2001 | Breslau et al. | 717/140 |
| 2005/0055665 | A1 | * | 3/2005 | Woo et al. | 717/101 |

* cited by examiner

*Primary Examiner* — Philip Wang
(74) *Attorney, Agent, or Firm* — William Stock; Anne Vachon Dougherty

(57) ABSTRACT

A method and system for building an embedded software package for a target system including creating a cross-compiling stub in the target system, wherein the stub accesses a compiling tool at a remote location, starting a software package building process at the target system, and intercepting a compiling command coming from said software package building process and forwarding the compiling commands to said remote compiling server using the cross-compiling tool stub so that a source file will be compiled by a corresponding cross-compiling tool in the remote compiling server. The method and system allow a developer of software for an embedded system be able to start a software package building process on the target system as in the native compilation situation, and have the actual compiling of the source file in the software package be performed by cross-compiling tools in another computer with high performance.

13 Claims, 4 Drawing Sheets

SYSTEM AND METHOD FOR BUILDING SOFTWARE PACKAGE FOR EMBEDDED SYSTEM

TECHNICAL FIELD

The present invention relates to the development of embedded systems, specifically, to the process of building an embedded software package.

TECHNICAL BACKGROUND

An embedded system is a computer system that is embedded in various devices and application products for controlling these devices and application products. Generally, the development of an embedded system will involve a cross-compiling approach. So-called cross-compiling means that codes are generated on a platform but executed on another platform. The reason for adopting a cross-compiling approach may be that the target platform (the system where the generated program will be executed) does not allow or is not able to have the required compiler installed on it, yet some features of the compiler are needed in developing software for the target platform. Another reason may be that the target platform is lacking in the necessary resources, so there is no way to run the required compiler. Yet another reason may be that the target platform has not been built up (e.g., no operating system on it) to run the required compiler. With regard to an embedded system, usually there are not sufficient resources for compiling and optimizing application softwares, and there is also not enough space for the whole development or debug effort. Accordingly during the development of embedded software, the cross-compiling approach is usually applied.

However, for the software developers of embedded systems, the cross-compiling is not a simple process. On one hand, the cross-compiling-based building process is usually faster than the native building process. On the other hand, it is much more difficult and complex than the native building process. Taking the transporting of a third-party software as an example, in the case of the native building process, there is rarely a need for the developer to modify the building process, he simply needs to enter a building command. However, in cross-compiling, the developer usually needs to take several hours or days to debug the building process itself before he/she can see the building process running to the end successfully. The troubles in cross-compiling result from the fact that the compile-time platform on which the building process runs is not the same as the target platform, (i.e. the run-time platform on which the built-out program will run). More specifically, this divergence between the compile-time platform and the run-time platform will cause problems in the following two situations:

1) It is common that some steps in the building process will try to run interim programs built out by previous steps. The interim programs may be used to probe characteristics in some aspects of the target platform and, based on the execution results of the interim programs, the building process can adjust the compiling options of some programs accordingly. An example of such an interim program is the one used to test the bit field ordering of the target platform. Another possible use of an interim program is for generating a source code segment to be compiled in later steps.

Obviously, in the cross-compiling setting, these steps will result in errors because the generated target binary code usually is not executable on the building platform, (i.e. compile-time platform).

2) Before compiling a source file, the building process generally will try to probe whether libraries, on which the software package to be built will depend, exist on the target system and where they are located. If the building process could not find some of the libraries, the corresponding invoking codes might not be included in the further compiling results. If the building process could find necessary libraries, the correct paths of the object files and header files of these libraries should be informed to the compiler.

However, in a cross-compiling situation, such library probing is not an easy task. Such a task often incorrectly ends up with "fake" libraries which are installed on the building platform and have the same names but are not the required libraries. This will definitely cause compiling errors in later steps.

An article entitled "Cross-compilation" disclosed a method for solving the problem in the first situation mentioned above for cross-compiling. The article is available on the interne at research.att.com/~gsf/download/crosscomp.html. The main idea of the method disclosed in the article is that, when the building process needs to run an interim program, the interim program will be remotely executed on the target system instead of on the compiling platform. However, this solution does not address the issue in the second situation mentioned above.

SUMMARY OF THE INVENTION

In order to solve the problem of being prone to errors when cross-compiling is used in software development for embedded systems, and at the same time to take advantage of the ease of the native building process of software fully, the present invention proposes a solution for building software packages for embedded systems that is highly efficient (like cross-compiling) and is also user friendly (like the native building).

Similar to the cross-compiling situation, in addition to the target system, the software package building solution of the present invention involves another computer system, which has much higher performance than the target system, but may have different architecture from the target system. In the present invention, the computer system with higher performance is referred to as a compiling server. Differing from cross-compiling, the software package building process of the invention is started on the target system like that in the native compiling. Preferably, the root file system of the target system resides on the compiling server and the target system will mount the root file system from the compiling server through a network.

The main idea of the invention is to realize a mechanism in which, whenever the building process on a target system tries to invoke a native compiler for compiling a source file in a source file package into an executable file, the invocation will be intercepted and redirected to the corresponding cross-compiling tool running on a remote compiling server. Because the compiling server has higher performance, it will take less time for using the cross-compiling tool running on the compiling server to compile the source file than using the corresponding native compiling tool on the target system (if one is available). Moreover, since the file system of the target system is actually stored in the compiling server, when the cross-compiling tool in the compiling server reads an input file and writes an output file, no network IO operations will be involved. Thus, in the present invention, the speed of compiling source files is as fast as that in the pure cross-compiling situation.

Thus, according to an aspect of the invention, there is provided a method for building a software package, comprising: creating a cross-compiling stub in a target system for building a software package, wherein the cross-compiling stub is for accessing a cross-compiling tool in a remote compiling server; starting a software package building process on the target system; and during the building process, intercepting a compiling command coming from the software package building process and forwarding the compiling command to the remote compiling server using the cross-compiling tool stub so that a source file will be compiled by a corresponding cross-compiling tool in said remote compiling server.

Preferably, the method for building a software package according to the present invention further comprises: storing an image of the file system in the target system into said compiling server. The step of forwarding the compiling command to the remote compiling server further comprises forwarding the compiling command and a command line parameter in the building process on the target system to a building daemon in the remote compiling server by the cross-compiling tool stub, invoking a corresponding cross-compiling tool in the remote compiling server by the building daemon with the received command line parameter, reading out the source file to be compiled in a source file package from the file system image of the target system in the compiling server according to the command line parameter, and compiling the source file to generate binary codes executable on the target system by the invoked corresponding cross-compiling tool.

Preferably, the method for building a software package according to the present invention further comprises: writing the compiling result of said source file into the file system image of the target system in the compiling server by the invoked cross-compiling tool; and reading the software compiling result from the file system image of the target system in the compiling server and continuing the subsequent software package building jobs by the building process on the target system.

Preferably, the method for building a software package according to the present invention further comprises: translating an absolute path present in said command line parameter as well as the "#include" line in the source file to be compiled into a corresponding path valid in the file name space of said compiling server; or changing the root directory of the invoked cross-compiling tool in the compiling server to the path corresponding to the root directory for the file system of the target system and copying the executable files and libraries related to the invoked cross-compiling tool into the changed root directory and setting the current working directory of the invoked cross-compiling tool in the compiling server to a path matching the current directory where the building process on the target system is located when invoking the corresponding cross-compiling tool stub.

According to another aspect of the present invention, there is provided a system for building a software package, comprising: a compiling server that includes a building daemon for receiving a compiling tool invoking request from a target system and invoking a corresponding cross-compiling tool based on the invoking request; and at least one cross-compiling tool for compiling the specified source file into binary codes executable on the target system; and at least one cross-compiling tool stub deployed in the target system, each of which corresponds to a corresponding cross-compiling tool in the compiling server, for intercepting a compiling command coming from a software package building process and forwarding it to the compiling server, where the corresponding cross-compiling tool will compile the corresponding source file in the target system.

Preferably, the compiling server further comprises: a file system image of the target system, wherein said cross-compiling tool reads a source file to be compiled and related files from a specified source file package in the file system image of the target system and writes the compiling result into the file system image that can be accessed by the target system immediately.

Preferably, the compiling server further comprises a network file system, through which said target system can access files in the file system image of the target system that resides on the compiling server.

Preferably, the target system comprises a cross-compiling tool stub creating module, for interacting with the remote compiling server so as to create, on the target system, cross-compiling tool stubs for respective cross-compiling tools in the remote compiling server.

compared to the native compiling, the software package building method and system provided by the present invention has the advantage of faster compile speed as compared to using cross-compiling during the software building; at the same time, compared to the cross-compiling, the method and system is further able to maintain the ease of the native building approach. That is to say, since the main building process of the invention is executed on the target system actually, the developers of embedded software will not encounter those problems found in the cross-compiling situation. More specifically, 1) If a step in the building process needs to execute an interim program compiled in previous steps, the invention ensures the program is executable on the target system as usual;

2) The probe of libraries or other dependency files in the building process of the invention would not end up with a "fake" library or file as in the prior art cross-compiling situation.

By combining the speed of the cross-compiling and the ease of the native-compiling, the present invention can bring the best compiling efficiency to those developers of embedded software in most cases.

These and other aspects of the present invention will become more apparent from the following detailed description of the preferred embodiments of the present invention with reference to the drawings.

DETAILED DESCRIPTION OF THE INVENTION

Next, a detailed description will be given to the preferred embodiments of the present invention with reference to the drawings.

Figure 1:
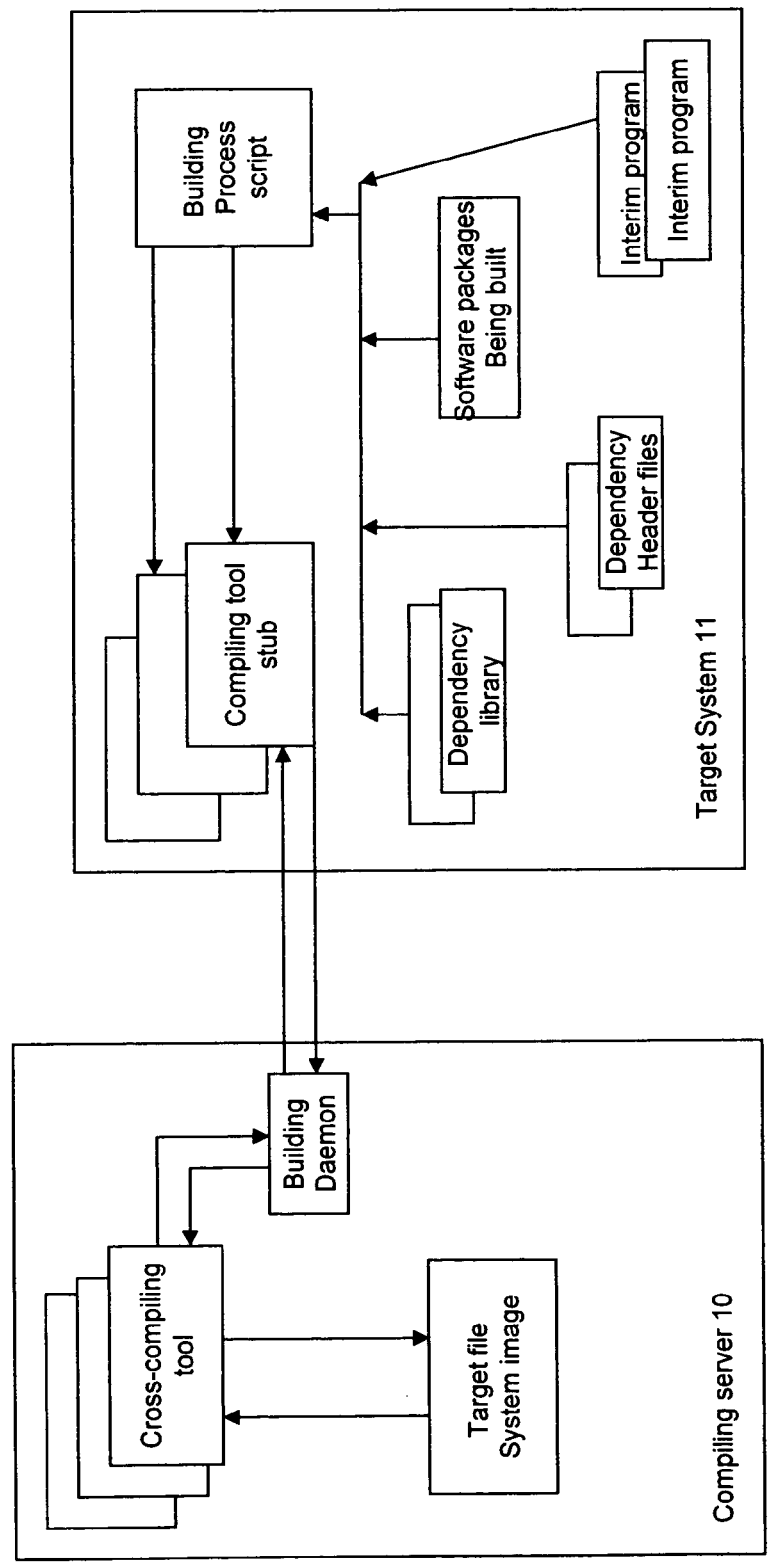
FIG. 1 is a schematic diagram of a system for building a software package for an embedded system according to a preferred embodiment of the present invention.

FIG. 1 is a schematic diagram of a system for building a software package for an embedded system according to a preferred embodiment of the present invention.

As shown in FIG. 1, the software package building system consists of a compiling server 10 and the part deployed in an embedded target system 11. The compiling server 10 is used to compile the source files in a software source file package on the target system into binary codes executable on the target system. The part deployed in the embedded target system 11 is used to execute the whole process for building the embedded software package and requesting the compiling server 10 to compile a source file in the source file package on demand. The compiling server 10 and the target system 11 may be connected through a wire or wireless network (not shown). Those skilled in the art will easily understand that the target system 10 may also be a virtual target system.

Figure 2:
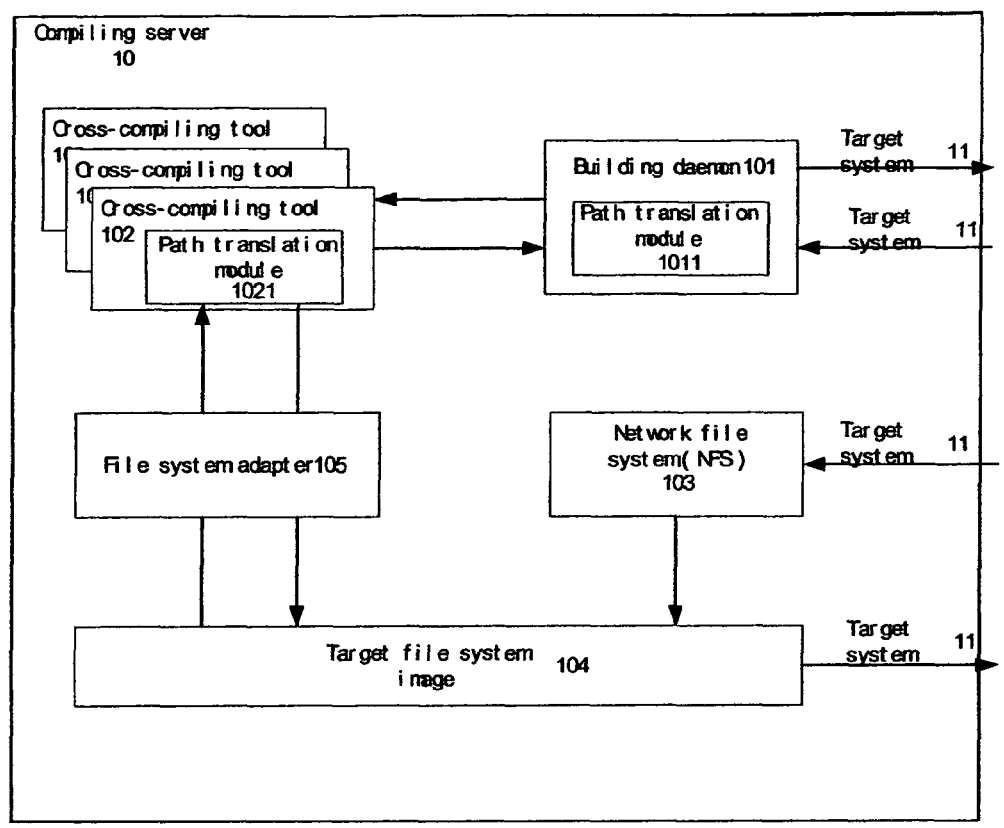
FIG. 2 is a block diagram of the compiling server in the system of FIG. 1 according to a preferred embodiment of the present invention.

FIG. 2 is a detailed block diagram of the compiling server 10 in the embodiment of FIG. 1. As shown in FIG. 1, the compiling server 10 includes a building daemon 101, one or more cross-compiling tools 102, a network file system (NFS) 103, a target file system image 104 and a file system adapter 105.

The building daemon 101 is used to receive a request for a compiling tool from the cross-compiling tool stubs in the target system 11 and is used to invoke the corresponding cross-compiling tool 102 in the compiling server 10 with the command line parameters attached in the request. In addition, the building daemon 101 also bridges the standard input and output of the invoked cross-compiling tool 102 in the compiling server 10 to the corresponding cross-compiling tool stub.

One or more cross-compiling tools 102 are used to compile specified source files into binary codes executable on the target system. The cross-compiling tools 102 include various programs in a compiling toolkit used for compiling a source file in a high-level language into an executable file step by step, such as the cross-preprocessor, cross-compiler, cross-linker, cross-assembler, and other necessary tools that a normal cross-compiling toolkit will provide. In one embodiment, the cross-compiling tools 102 are those compiling tools provided in a GNU compiling toolkit, including preprocessor, C/C++ compiler, assembler, linker, and binary utilities and so on. The output files from the cross-compiling tools 102 will be in the file format of the target system 11. For instance, when the compiling server 10 is a PC running Windows, and the target system 11 is a Linux on PowerPC, then the cross-compiling tools 102 should generate codes that are valid on PowerPC Linux.

In order to make the cross-compiling tools 102 be able to compile source files in the target system 11, it is essential that the cross-compiling tools 102 should be able to access files in the target system 11. More specifically, the cross-compiling tools 102 should be able to read input files to be compiled in the target system 11 as directed by the building daemon 101 and write the compiled output files back to the file system of the target system 11, and the target system 11 should be able to immediately read the compiled output files. However, since the speed of file I/O is also an important factor impacting overall compiling speed, in the present embodiment, the file system of the target system 11 is stored in the compiling server 10 so that the cross-compiling tools 102 can read and write their working files with the least overhead. The target system 11 will mount its file system from the compiling server 10 through a network.

Thus, in the present embodiment, there is included a network file system (NFS) 103 in the compiling server 10. The network file system (NFS), such as one offered by Sun Microsystems Co., is used for sharing files among different operating systems, different network architectures and different transmission protocols. The target system can access the files in its file system image 104, residing on the compiling server 10 through the network file system (NFS) 103. Each cross-compiling tool 102 in the compiling server 10 reads source files to be compiled and dependency files (dependency libraries, dependency header files and others) in a specified source file package from the target file system image 104 and writes the compiling result into the file system image so that the target system 11 can immediately access the compiled output files.

Besides, the file system adapter 105 in the compiling server 10 is used to provide translation between the file types of the compiling server 10 and the target file system image 104 in the case that the compile sever 10 does not natively support the file system type of the target system 11 so that the cross-compiling tools 102 can access the files in the file system image 104 of the target system 11, that resides on the compiling server 10.

The target file system image residing on the compiling server may be output through the network file system (NFS) service in the compiling server, and the target system may load it as a root file system through a client-side program of the network file system. Thus, the cross-compiling tools 102 in the compiling server 10 and the building process on the target system 11 can work under the same file system environment effectively. However, the compiling server and the target system usually have different file system name spaces. For instance, the root directory of the target system may need to be accessed on the compiling server with a path name like "/opt/target_root". When the building process on the target system names a file path, the path is only valid in the file system name space on the target system. Thus, before a cross-compiling tool in the compiling server tries to access a file or directory in the target file system image in the compiling server according to a path named by the building process on the target system, it is necessary to translate the path according to the file system name space on the compiling server. Thus, in the present embodiment, the building daemon 101 further includes a path translation module 1011, and each cross-compiling tool 102 also includes a corresponding path translation module 1021, for performing translation from a named path in the target system to a valid path in the compiling server. There may be three types of file paths used in the building process of a software, including absolute path, standard system directory path and current working directory relative path. A description of the translation for these paths, respectively, follows.

1) Absolute Path

An absolute path is one preceded with "/" on unix or "\" on Windows.

In one embodiment of the present invention, the path translation module 1011 in the daemon 101 scans the command line parameters received from the building process of the target system 11 and the path translation module 1021 in each cross-compiling tool 102 scans the "#include" line in the source files to be compiled in the target system so as to find out all the absolute paths and translate them into corresponding valid ones in the file name space of the compiling server. For instance, if the building process of the target system 11 invokes a compiler with parameters "-L/usr/local/xine/lib-I/usr/local/xine/include/home/xwk/src/xine/xine.c . . . ", then the path translation module 1011 should translate the path into the path "-L/opt/target_root/usr/local/xine/lib-I/opt/target_root/usr/local/xine/include/opt/target_root /home/xwk/src/xine/xine.c . . . " in the compiling server.

In another embodiment of the present invention, the absolute path translation approach is different from the above embodiment. In the present embodiment, instead of translating the file's absolute path, the daemon 101 will set the root directory of the invoked cross-compiling tool 102 to the same location as the root directory of the target file system. This is usually done by the command "chroot" on unix. Thus, in such a situation, the root directory of the invoked cross-compiling tool 102 in the previous example will be set to "/opt/target_root". Thus, the invoked cross-compiling tool 102 in the compiling server will actually see the same file name space as that in the target system 11. However, in such a situation, when the root directory of the invoked cross-compiling tool 102 is changed, all executable files and libraries that may be invoked in the executing process of the invoked cross-compiling tool 102 should be copied to a corresponding location under the new root directory, and the environment variables PATH and LD_LIBRARY_PATH also should be updated accordingly. Otherwise, the invoked cross-compiling tool 102 will not be able to find these files during running.

2) Standard System Directory Path

The "standard system directory path" is a conventional C language and C compiler notion. When a software developer specifies a "#include<header>" directive or specifies a "-include header" or "-library lib" compiler option in a source file, the compiling tool will search for specified header files or libraries in the predefined standard system directories. For instance, in the case that the cross-compiling tools 102 are GNU compiling tools, these directories are "/include", "/usr/include", "/usr/lib" and so on.

In order to deal with the translation, the standard system directory paths of the cross-compiling tools 102 should be correctly set to the standard system directories of the target system. Still taking the above-mentioned file system name space configuration as the example, the standard system directory paths of the cross-compiling tools 102 should be set to "/opt/target_root/include", "/opt/target_root/usr/include", "/opt/target_root/usr/lib" and so on. The standard system directory paths of the cross-compiling tools 102 are statically specified when these cross-compiling tools are generated.

3) Current Working Directory Relative Path

All other paths fall within the scope of "current working directory relative path" except the above-described two types of paths. For these paths, the path translation module 1011 in the daemon 101 sets the current working directory of the invoked cross-compiling tool 102 to a path matching the current directory where the building process on the target system is located when it invokes the corresponding cross-compiling tool stub.

Figure 3:
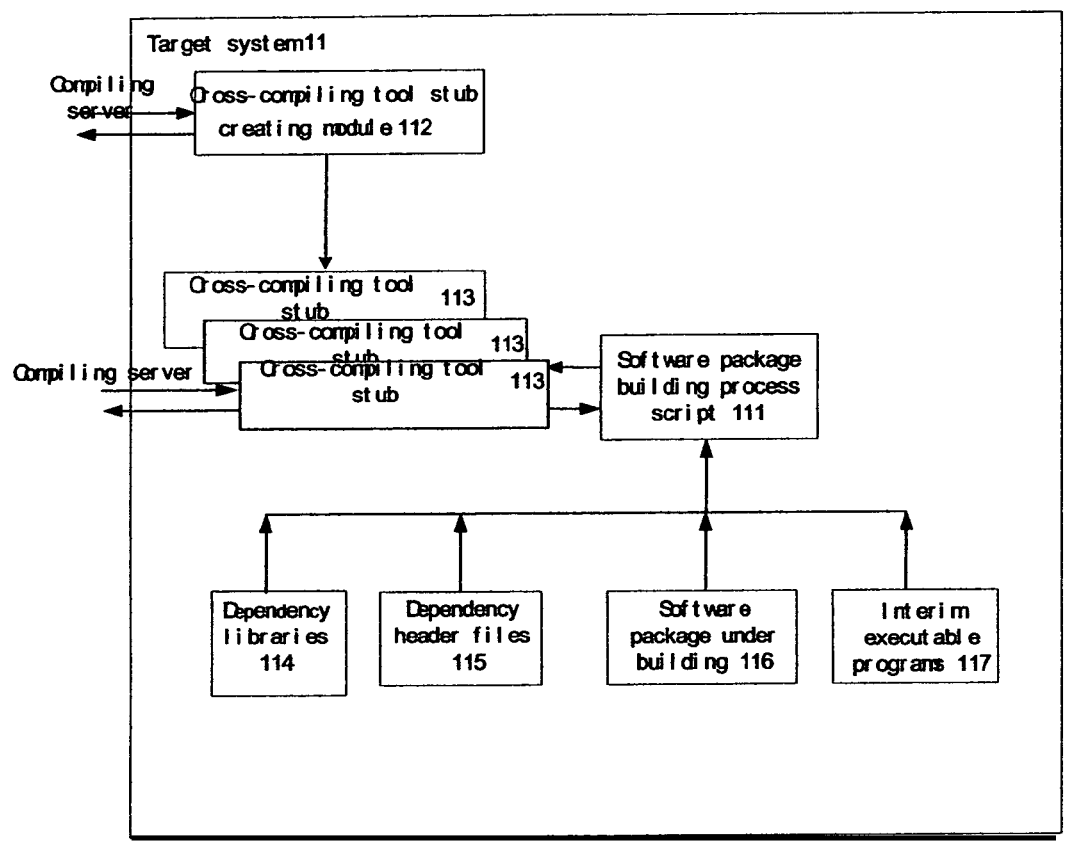
FIG. 3 is a block diagram of a part of the system in FIG. 1 deployed in the target system according to a preferred embodiment of the present invention.

FIG. 3 is a detailed block diagram of a part of the system in FIG. 1 deployed in the target system. As shown in FIG. 3, in the present embodiment, the part deployed in the target system 11 includes a software package building process script 111, a cross-compiling tool stub creating module 112, one or more cross-compiling tool stubs 113, and dependency libraries 114, dependency header files 115, a software package under building 116, interim executable programs 117 and others.

The software package building process script 111 is used to invoke the dependency libraries 114, the dependency header files 115, the interim executable programs 117 and others, to perform the whole building process for the software packages in the target system 11, including compiling, linking and optimizing and so on, so as to finally build up a software package executable on the target system. When a source file in the source file package is compiled, the software package building process script 111 invokes a corresponding cross-compiling tool stub 113 in the target system 11, and further invokes the corresponding cross-compiling tool 102 in the compiling server 10 to compile the source file.

Creating a stub, on the target system, of a cross-compiling tool in the compiling server means copying a cross-compiling tool stub that has the same file name as the native compiling tool to be replaced to the target system so as to replace the corresponding native compiling tool. The creating process of a cross-compiling tool stub may be a manual process by a system administrator, wherein, when the target system is established, the system administrator copies a cross-compiling tool stub that has the same file name as the native compiling tool to be replaced to the target system so as to replace the corresponding native compiling tool. Alternatively, the creating process may be an automatic process by the cross-compiling tool stub creating module 112, such that, when the target system is established, the cross-compiling tool stub creating module 112 automatically creates, on the target system 11, stubs for respective cross-compiling tools 102 in the remote compiling server 10 through interaction with the remote compiling server 10.

For each cross-compiling tool 102 in the compiling server 10, there exists a corresponding cross-compiling tool stub 113 in the target system. These stubs do not perform a real compile job, but forward the compiling commands and command line parameters from the software package building process script 111 to the building daemon 101 in the compiling server 10 and the daemon 101 invokes a corresponding cross-compiling tool 102 in the compiling server to do the compile job. Moreover, these cross-compiling tool stubs 113 further redirect their standard inputs and outputs to the remote building daemon 101, since sometimes the building process script 111 in the target system 11 may use these standard inputs to feed information other than the command line parameters to the cross-compiling tools 102 in the compiling server 10, or may use the standard outputs to get execution status reports and other information from the cross-compiling tools 102.

Above, in conjunction with the drawings, a detailed description has been given to a software package building system for an embedded system according to preferred embodiments of the present invention.

Under the same inventive concept, according to another aspect of the present invention, there is provided a software package building method for an embedded system. Next, a detailed description will be given to the method in conjunction with the drawings.

Figure 4:
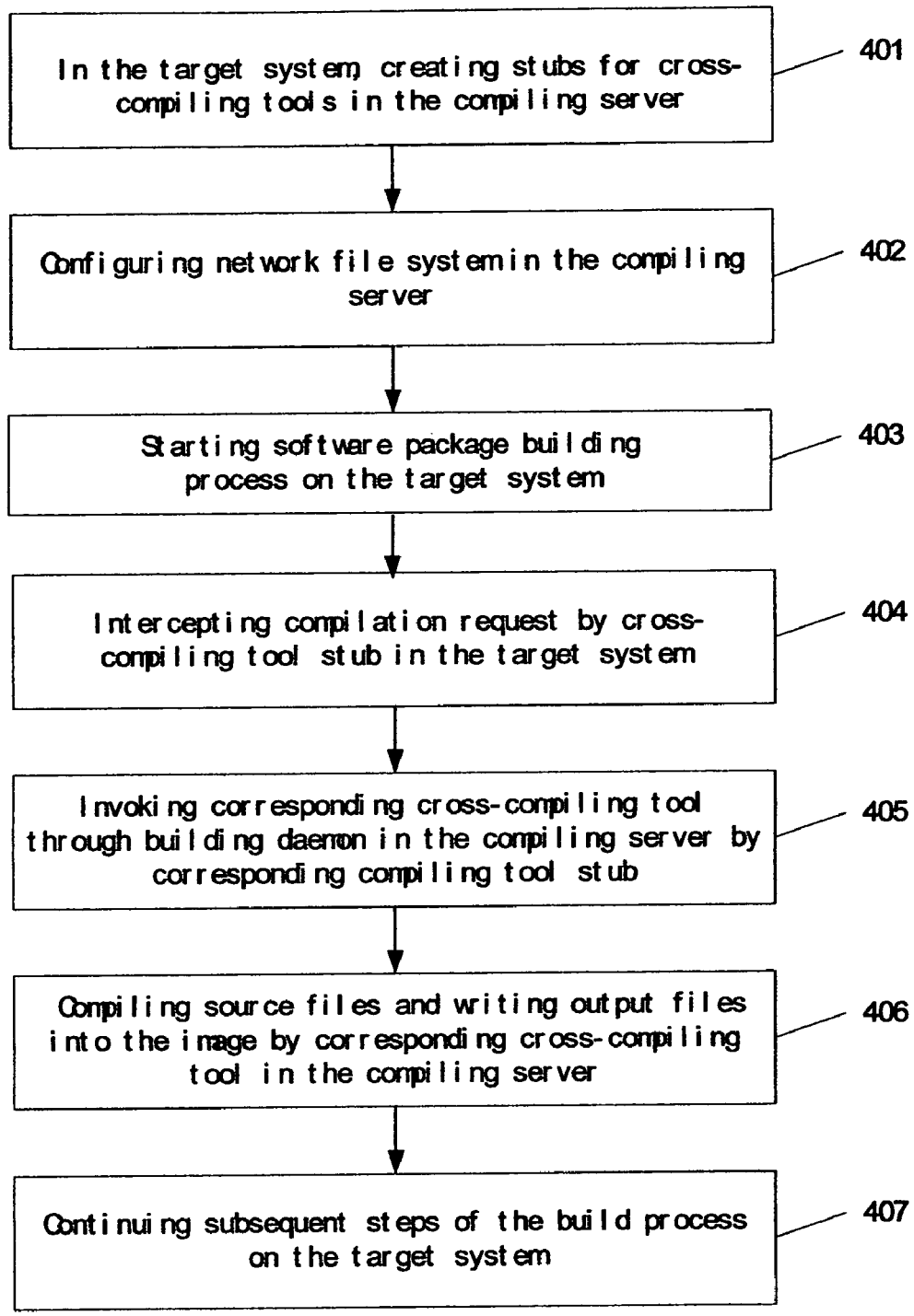
FIG. 4 a flowchart of a method for building a software package for an embedded system according to a preferred embodiment of the present invention.

FIG. 4 is a flowchart of a method for building a software package for an embedded system according to a preferred embodiment of the present invention.

As shown in FIG. 4, the method comprises the following steps:

At Step 401, in the target system, creates stubs for cross-compiling tools in the compiling server. Specifically, the creating process of the cross-compiling tool stub may be either a manual process by a system administrator, that is, when the target system is established, the system administrator copies a cross-compiling tool stub that has the same file name as the native compiling tool to be replaced to the target system so as to replace the corresponding native compiling tool, or an automatic process by a cross-compiling tool stub creating module, that is, when the target system is established, the cross-compiling tool stub creating module automatically creates, on the target system, stubs for respective cross-compiling tools in the remote compiling server through interaction with the remote compiling server.

At Step 402, a network file system service is configured to allow the compiling server and the target system to be able to share an image of the target file system residing on the compiling server.

Then, at Step 403, the software developer of an embedded system starts an executable software package building process on the target system for a source file package.

At Step 404, during the building process, a cross-compiling tool stub in the target system intercepts a compiling tool invocation request sent by the building process.

At Step 405, the cross-compiling tool stub in the target system forwards the compiling tool invocation request to a building daemon in the compiling server through a network. The building daemon, after match translation of the file paths in the invocation request and the related working directories of the cross-compiling tool to be invoked, natively invokes a cross-compiling tool corresponding to the cross-compiling tool stub in the target system that has sent the invocation request with command line parameters.

At Step 406, the invoked cross-compiling tool in the compiling server, compiles the specified source files in the target file system image so as to generate binary codes executable on the target system and writes the compiled output files into the image, then the compiling status is reported to the building process on the target system through the building daemon. It may be based on the target file system image and in conjunction with the related header files and related libraries Then, at Step 407, after completion of source file compile, the building process on the target system will continue the subsequent building steps It should be noted that, in the software package building process on the target system, there may be a need to execute some compiled interim executable programs, in such a case, the building process can directly execute these interim programs based on the specified paths without encountering the problem that a generated interim program cannot be executed on the software building platform as in the conventional cross-compiling approach.

It should be noted that, the step order in the embodiment shown in FIG. 4 is only exemplary and the present invention may be implemented in different step orders in specific implementations. For instance, when it is needed to execute the software building process for several times on the same target system, the steps 401 and 402 need to be executed only once at the time of system establishment, there is no need to execute them repeatedly. That is, only when the target system is established are stubs for the cross-compiling tools created in the target system and a network file system service configured in the compiling server.

Using the software package building method and system for an embedded system as described above in conjunction with the drawings, a software developer only needs to copy the software source file package into the target file system and enter a building command on the target system as in the native compiling approach, whereupon the whole building process of a software package would be automatically accomplished.

Above, the software package building method and system of the present invention for an embedded system have been described in conjunction with the drawings. It is apparent to those skilled in the art that the present invention is suitable for all systems that need cross-compiling. It should be further noted that these embodiments are just exemplary and those skilled in the art may make various changes on the basis of them.

The invention claimed is:

1. A computer-implemented method for building a software package in a target system, wherein the target system comprises a cross-compiling stub for accessing a cross-compiling tool in a remote compiling server, comprising the steps of:
   starting a software package building process wherein the building process starts on the target system at which compiled code will run after compiling;
   intercepting at least one compiling command coming from said software package building process;
   forwarding the at least one compiling command to said remote compiling server by said cross-compiling tool stub, whereby a source file will be compiled by a cross-compiling tool in said remote compiling server; and
   creating stubs for respective cross-compiling tools in the remote compiling server, wherein the cross-compiling tools in said compiling server include cross-preprocessor, cross-compiler, cross-assembler and cross-linker.

2. The method according to claim 1, further comprising storing an image of a file system of the target system in said compiling server.

3. The method according to claim 2, wherein said step of forwarding the compiling command to said remote compiling server further comprises:
   forwarding the compiling command and a command line parameter from the building process on the target system to a building daemon on said compiling server by said cross-compiling tool stub;
   invoking a corresponding cross-compiling tool in said remote compiling server by said building daemon with the received command line parameter; and
   reading out a source file to be compiled in a source file package from the file system image of the target system in the compiling server according to said command line parameter, and compiling the source file to generate binary codes executable on the target system by said invoked corresponding cross-compiling tool.

4. The method according to claim 3, further comprising:
   writing a compiling result of said source file into the file system image of the target system in the compiling server tool; and
   reading the compiling result from the file system image of the target system in said compiling server and continuing subsequent software package building jobs by the building process on said target system.

5. The method according to claim 3, further comprising:
   translating an absolute path present in said command line parameter as well as a "#include" line in the source file to be compiled into a corresponding path valid in the file name space of said compiling server.

6. The method according to claim 3, further comprising:
   setting a tool root directory of the invoked cross-compiling tool in the compiling server to the same path as a file root directory for the file system of the target system and copying executable files and libraries related to the invoked cross-compiling tool into the tool root directory.

7. The method according to claim 3, further comprising:
   setting a current working directory of the invoked cross-compiling tool in the compiling server to a path matching a current directory where the building process on the target system is located when invoking the corresponding cross-compiling tool stub.

8. The method according to claim 3, further comprising:
   redirecting standard inputs and outputs of the cross-compiling tool stub in said target system to a building daemon on said compiling server so as to communicate information about the building process.

9. A system for building a software package, comprising:
   a compiling server that includes a building daemon for receiving a compiling tool invoking request from a target system and invoking a corresponding one of at least one cross-compiling tools based on the invoking request and at least one cross-compiling tool for compiling the specified source files into binary codes executable on the target system;
   at least one cross-compiling tool stub deployed in the target system for intercepting a compiling command coming from a software package building process started on the target system and forwarding it to the compiling server, where the corresponding cross-compiling tool will compile the corresponding source file in the target system; and a cross-compiling tool stub creating module in said target system, for interacting with the compiling server so as to create, in the target system, stubs for each of the cross-compiling tools in the remote compiling server, wherein the cross-compiling tools in said compiling server include cross-preprocessor, cross-compiler, cross-assembler and cross-linker.

10. The system according to claim 9, wherein said compiling server further comprises:

a file system image of the target system, wherein said cross-compiling tool reads a specified source file to be compiled and related files from the file system image of the target system and writes at least one compiling result into the file system image.

11. The system according to claim 10, wherein said compiling server further comprises:

a network file system for sharing the file system image of said target system between said compiling server and said target system.

12. The system according to claim 10, wherein said building daemon further comprises:

a path translation module for performing one of translating an absolute path present in a command line parameter of an invocation request received from the target system into a corresponding path valid in a file name space of the compiling server and setting a tool root directory of the invoked cross-compiling tool in the compiling server to a same path as a root directory for the file system of the target system, and copying the executable files and libraries related to the invoked cross-compiling tool to the tool root directory; and setting a current working directory of the invoked cross-compiling tool in the compiling server to a path matching a directory where the building process on the target system is located when invoking the cross-compiling tool stub.

13. The system according to claim 12, wherein each of said cross-compiling tools comprises:

a path translation module for translating a path present in the "#include" line of the source file to be compiled into a corresponding path valid in the file name space of the compiling server.

* * * * *